(12) United States Patent
Rao et al.

(10) Patent No.: US 12,347,143 B2
(45) Date of Patent: Jul. 1, 2025

(54) REINFORCEMENT-LEARNING BASED SYSTEM FOR CAMERA PARAMETER TUNING TO IMPROVE ANALYTICS

(71) Applicant: NEC Laboratories America, Inc., Princeton, NJ (US)

(72) Inventors: Kunal Rao, Monroe, NJ (US); Giuseppe Coviello, Robbinsville, NJ (US); Murugan Sankaradas, Dayton, NJ (US); Oliver Po, San Jose, CA (US); Srimat Chakradhar, Manalapan, NJ (US); Sibendu Paul, West Lafayette, IN (US)

(73) Assignee: NEC Corporation, Tokyo (JP)

( * ) Notice: Subject to any disclaimer, the term of this patent is extended or adjusted under 35 U.S.C. 154(b) by 605 days.

(21) Appl. No.: 17/825,519

(22) Filed: May 26, 2022

(65) Prior Publication Data
US 2022/0414935 A1 Dec. 29, 2022

Related U.S. Application Data

(60) Provisional application No. 63/196,399, filed on Jun. 3, 2021.

(51) Int. Cl.
*G06T 7/80* (2017.01)
*G06T 7/00* (2017.01)
(52) U.S. Cl.
CPC .............. *G06T 7/80* (2017.01); *G06T 7/0002* (2013.01); *G06T 2207/10016* (2013.01); *G06T 2207/20081* (2013.01); *G06T 2207/20084* (2013.01)
(58) Field of Classification Search
CPC ......... G06F 1/1686; G06F 2203/04806; G06F 2203/0381; G06T 2207/10016;
(Continued)

(56) References Cited

U.S. PATENT DOCUMENTS

2018/0108121 A1* 4/2018 McCaughan .............. G06T 5/80
2019/0122378 A1* 4/2019 Aswin ........................ G06T 7/20
(Continued)

OTHER PUBLICATIONS

Canel, C., Kim, T., Zhou, G., Li, C., Lim, H., Andersen, D. G., ... & Dulloor, S. (Apr. 15, 2019). Scaling video analytics on constrained edge nodes. Proceedings of Machine Learning and Systems, 1, 406-417.
(Continued)

*Primary Examiner* — Aaron W Carter
*Assistant Examiner* — Courtney Joan Nelson
(74) *Attorney, Agent, or Firm* — Joseph Kolodka

(57) ABSTRACT

A method for automatically adjusting camera parameters to improve video analytics accuracy during continuously changing environmental conditions is presented. The method includes capturing a video stream from a plurality of cameras, performing video analytics tasks on the video stream, the video analytics tasks defined as analytics units (AUs), applying image processing to the video stream to obtain processed frames, filtering the processed frames through a filter to discard low-quality frames and dynamically fine-tuning parameters of the plurality of cameras. The fine-tuning includes passing the filtered frames to an AU-specific proxy quality evaluator, employing State-Action-Reward-State-Action (SARSA) reinforcement learning (RL) computations to automatically fine-tune the parameters of the plurality of cameras, and based on the reinforcement computations, applying a new policy for an agent to take actions and learn to maximize a reward.

13 Claims, 5 Drawing Sheets

(58) Field of Classification Search
CPC .............. G06T 19/006; G06T 2215/16; G06T 2207/10024; G06T 5/70; G06T 5/73; G06T 2207/20081; G06T 2207/20084; G06T 7/80; G06T 7/0002; G06N 3/092; H04N 13/243; H04N 23/60; H04N 5/2628

See application file for complete search history.

(56) References Cited

U.S. PATENT DOCUMENTS

2020/0221009 A1* 7/2020 Citerin .................. H04N 23/67
2020/0342652 A1* 10/2020 Rowell ................. G06V 10/82

OTHER PUBLICATIONS

Dong, J., Frosio, I., & Kautz, J. (Jan. 28, 2018). Learning adaptive parameter tuning for image processing. Electronic Imaging, 2018(13), 196-1.

Du, K., Pervaiz, A., Yuan, X., Chowdhery, A., Zhang, Q., Hoffmann, H., & Jiang, J. (Jul. 30, 2020). Server-driven video streaming for deep learning inference. In Proceedings of the Annual conference of the ACM Special Interest Group on Data Communication on the applications, technologies, architectures, and protocols for computer communication (pp. 557-570).

Heide, F., Steinberger, M., Tsai, Y. T., Rouf, M., Pajk, D., Reddy, D., . . . & Pulli, K. (Nov. 19, 2014). Flexisp: A flexible camera image processing framework. ACM Transactions on Graphics (ToG), 33(6), 1-13.

Jiang, J., Ananthanarayanan, G., Bodik, P., Sen, S., & Stoica, I. (Aug. 7, 2018). Chameleon: scalable adaptation of video analytics. In Proceedings of the 2018 Conference of the ACM Special Interest Group on Data Communication (pp. 253-266).

Kang, D., Emmons, J., Abuzaid, F., Bailis, P., & Zaharia, M. (Mar. 7, 2017). Noscope: optimizing neural network queries over video at scale. arXiv preprint arXiv:1703.02529.

Zhang, H., Ananthanarayanan, G., Bodik, P., Philipose, M., Bahl, P., & Freedman, M. J. (Mar. 27, 2017). Live Video Analytics at Scale with Approximation and {Delay-Tolerance}. In 14th USENIX Symposium on Networked Systems Design and Implementation (NSDI 17) (pp. 377-392).

Zhang, B., Jin, X., Ratnasamy, S., Wawrzynek, J., & Lee, E. A. (Aug. 7, 2018). Awstream: Adaptive wide-area streaming analytics. In Proceedings of the 2018 Conference of the ACM Special Interest Group on Data Communication (pp. 236-252).

Wu, C. T., Isikdogan, L. F., Rao, S., Nayak, B., Gerasimow, T., Sutic, A., . . . & Michael, G. (Sep. 22, 2019). VisionISP: Repurposing the image signal processor for computer vision applications. In 2019 IEEE International Conference on Image Processing (ICIP) (pp. 4624-4628). IEEE.

Wang, Y., Wang, W., Zhang, J., Jiang, J., & Chen, K. (2019, July 8). Bridging the {Edge-Cloud} Barrier for Real-time Advanced Vision Analytics. In 11th USENIX Workshop on Hot Topics in Cloud Computing (HotCloud 19).

Schwartz, E., Giryes, R., & Bronstein, A. M. (Oct. 1, 2018). Deepisp: Toward learning an end-to-end image processing pipeline. IEEE Transactions on Image Processing, 28(2), 912-923.

Paul, S., Drolia, U., Hu, Y. C., & Chakradhar, S. T. (Dec. 14, 2021). Aqua: Analytical quality assessment for optimizing video analytics systems. In 2021 IEEE/ACM Symposium on Edge Computing (SEC) (pp. 135-147). IEEE.

Li, Y., Padmanabhan, A., Zhao, P., Wang, Y., Xu, G. H., & Netravali, R. (Jul. 30, 2020). Reducto: On-camera filtering for resource-efficient real-time video analytics. In Proceedings of the Annual conference of the ACM Special Interest Group on Data Communication on the applications, technologies, architectures, and protocols for computer communication (pp. 359-376).

Chen, T. Y. H., Ravindranath, L., Deng, S., Bahl, P., & Balakrishnan, H. (Nov. 1, 2015). Glimpse: Continuous, real-time object recognition on mobile devices. In Proceedings of the 13th ACM Conference on Embedded Networked Sensor Systems (pp. 155-168).

Jang, S. Y., Lee, Y., Shin, B., & Lee, D. (Oct. 25, 2018). Application-aware IoT camera virtualization for video analytics edge computing. In 2018 IEEE/ACM Symposium on Edge Computing (SEC) (pp. 132-144). IEEE.

* cited by examiner

REINFORCEMENT-LEARNING BASED SYSTEM FOR CAMERA PARAMETER TUNING TO IMPROVE ANALYTICS

RELATED APPLICATION INFORMATION

This application claims priority to Provisional Application No. 63/196,399 filed on Jun. 3, 2021, the contents of which are incorporated herein by reference in their entirety.

BACKGROUND

Technical Field

The present invention relates to video analytics and, more particularly, to a reinforcement-learning based system for camera parameter tuning to improve analytics.

Description of the Related Art

Video analytics has become popular in the past decade due to advancements in computer vision algorithms, deep learning, edge computing, 5G, etc. This market has gained even more traction during the COVID-19 era because authorities are seeing value in performing analytics on video feeds to handle emerging COVID-19 specific applications such as limiting crowd, enforcing social distancing, contact tracing, etc. City-wide, ubiquitous edge-camera deployment enables a variety of analytics tasks to be performed on video feeds. These video feeds, however, are directly affected by the environment (which keeps changing) in which they are deployed in. Without accounting for the change and adapting to it, the accuracy of analytics tasks may degrade.

SUMMARY

A method for automatically adjusting camera parameters to improve video analytics accuracy during continuously changing environmental conditions is presented. The method includes capturing a video stream from a plurality of cameras, performing video analytics tasks on the video stream, the video analytics tasks defined as analytics units (AUs), applying image processing to the video stream to obtain processed frames, filtering the processed frames through a filter to discard low-quality frames and dynamically fine-tuning parameters of the plurality of cameras. The fine-tuning includes passing the filtered frames to an AU-specific proxy quality evaluator, employing State-Action-Reward-State-Action (SARSA) reinforcement learning computations to automatically fine-tune the parameters of the plurality of cameras, and based on the reinforcement computations, applying a new policy for an agent to take actions and learn to maximize a reward.

A non-transitory computer-readable storage medium comprising a computer-readable program for automatically adjusting camera parameters to improve video analytics accuracy during continuously changing environmental conditions is presented. The computer-readable program when executed on a computer causes the computer to perform the steps of capturing a video stream from a plurality of cameras, performing video analytics tasks on the video stream, the video analytics tasks defined as analytics units (AUs), applying image processing to the video stream to obtain processed frames, filtering the processed frames through a filter to discard low-quality frames and dynamically fine-tuning parameters of the plurality of cameras. The fine-tuning includes passing the filtered frames to an AU-specific proxy quality evaluator, employing State-Action-Reward-State-Action (SARSA) reinforcement learning computations to automatically fine-tune the parameters of the plurality of cameras, and based on the reinforcement computations, applying a new policy for an agent to take actions and learn to maximize a reward.

A system for automatically adjusting camera parameters to improve video analytics accuracy during continuously changing environmental conditions is presented. The system includes a memory and one or more processors in communication with the memory configured to capture a video stream from a plurality of cameras, perform video analytics tasks on the video stream, the video analytics tasks defined as analytics units (AUs), apply image processing to the video stream to obtain processed frames, filter the processed frames through a filter to discard low-quality frames and dynamically fine-tune parameters of the plurality of cameras. The fine-tuning includes passing the filtered frames to an AU-specific proxy quality evaluator, employing State-Action-Reward-State-Action (SARSA) reinforcement learning computations to automatically fine-tune the parameters of the plurality of cameras, and based on the reinforcement computations, applying a new policy for an agent to take actions and learn to maximize a reward.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
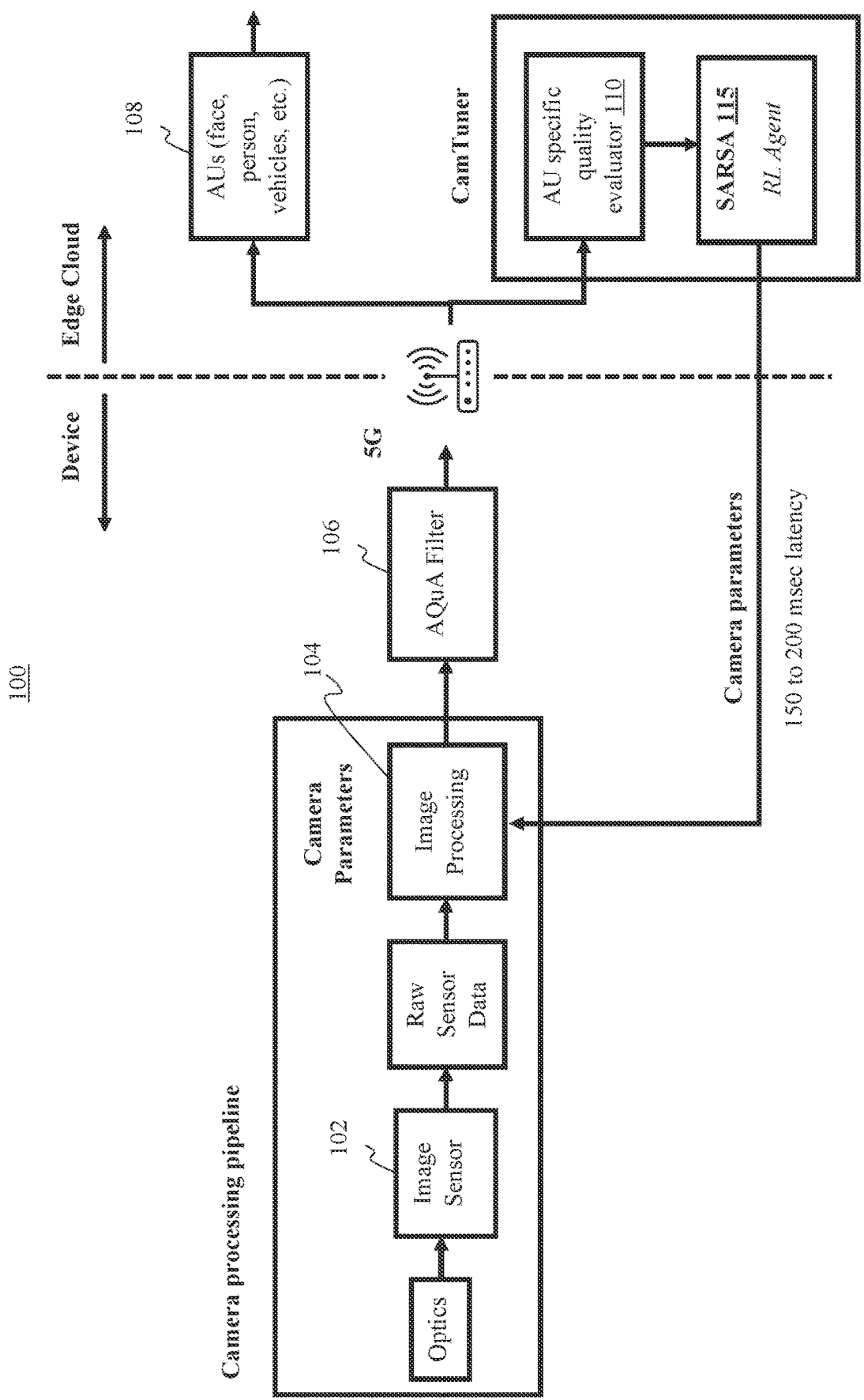
FIG. 1 is a block/flow diagram of an exemplary control loop to modify camera parameters, in accordance with embodiments of the present invention.

Video analytics has become very popular and widespread in the past decade due to advancements in computer vision algorithms, artificial intelligence, deep learning and machine learning, growth in Internet of Things (IoT) and edge computing, coupled with the availability of 5G, thereby enabling low latency and high bandwidth communications. These factors were already fueling the growth in overall video analytics market size in various sectors including surveillance, traffic monitoring, retail analytics, healthcare, banking, etc., but COVID-19 accelerated the growth even further.

Specifically, enforcing social distancing, administering government lockdowns and containment zones, temperature screening, limiting crowds and total number of people at any given point within a facility, recognizing individuals even with face masks, identifying demographics of people, enabling contactless transactions, payments, boarding, etc., have turned out to be new demands and video analytics is playing a major role in assisting the authorities in their day-to-day operations in handling these new and emerging COVID-19 specific scenarios.

Cameras are being deployed at city-scale throughout the world and different types of video analytics tasks are being performed on these video feeds. These video analytics tasks are referred to as Analytics Units (AUs). Depending on the requirements of the AUs, cameras may be deployed either indoors or outdoors e.g., for traffic analytics, video cameras are deployed outdoors pointing towards roads or highways, whereas for contactless boarding, cameras are deployed indoors pointing toward entrances of boarding gates. For the same task e.g., video surveillance, cameras may be deployed indoors (e.g., inside the building at hallways) as well as outdoors (e.g., parking lots). Thus, different AUs need different placement of video cameras and each of these cameras view different scenes. Particularly, the conditions may provide natural lighting from the sun, artificial lighting or a combination thereof. This leads to bright or dark scenes and varies over time e.g., for outdoor conditions, it varies based on the weather conditions (cloudy, sunny, rainy, foggy, etc.), time of the day (dawn, morning, afternoon, evening, dusk, twilight, night, etc.), and for indoor conditions it varies depending on the placement in the indoor location and amount of artificial and natural light in that area.

The particular direction of lighting also changes the way the scene is viewed by the camera because this changes the direction of shadows being projected. All these dynamically changing environmental conditions affect the accuracy of AUs. For a real-time response, the accuracy depends on the most recently observed video frames, which is directly impacted by the conditions being observed by the camera at that time.

The final image produced by any camera depends on the type of camera lenses, camera modules and sensors, and the overall Image Signal Processing (ISP) pipeline being used within the camera system. ISP plays an important role in this and transforms the captured raw data into final compressed images. As part of this, several configuration parameters, referred to as knobs, are exposed to tune the final image quality. The exemplary methods focus on a subset of these knobs. Camera vendors provide a default setting for various knobs, however, these default settings do not work out-of-the-box in providing good image quality for different deployment conditions. They provide some guidance in manually tuning these knobs and calibrating for specific deployment condition as per the location. However, this manual tuning and calibration assumes that the conditions would remain more or less the same in that specific location. As mentioned before, conditions keep changing, and initial calibration may not work well in new conditions.

Thus, there is a need to continuously tune these camera parameters so that high quality images can be produced by the ISP pipeline, which works well for video analytics tasks. Moreover, this needs to be done for each camera at a city-wide deployment scale, which is not practical for humans to do. CamTuner, proposed herein, addresses this need and automatically adjusts camera parameters to improve video analytics accuracy (for city-wide deployment scale). The exemplary methods leverage the fact that environmental changes are not sudden and happen gradually over a period of time, which enables CamTuner to constantly monitor the conditions and adjust and fine-tune dynamically as conditions change gradually.

The exemplary embodiments of the present invention empirically show that if camera parameters are not adjusted, then different AUs suffer with different levels of deterioration. The exemplary methods then show that there exists a better camera parameter setting that can improve AUs performance. The exemplary embodiments of the present invention introduce a new mechanism to find digital equivalence for physical camera parameters, called digital twin, which enables the performance of AUs under different camera settings to be analyzed. The exemplary embodiments of the present invention validate that for an AU, the best camera setting is different for different environmental conditions, thereby motivating the need for automatic and dynamic adjustment. The exemplary embodiments of the present invention introduce a State-Action-Reward-State-Action (SARSA) Reinforcement Learning (RL) algorithm (or computations) to dynamically adapt to changing environmental conditions and as part of this, the exemplary methods introduce a new policy for the agent to take actions and learn to maximize the reward.

The exemplary embodiments of the present invention propose a virtual-camera (VC) simulator, which enables the system to apply various environmental characteristics and study the impact of various camera settings on the exact same scene, and also allows for training and testing of RL algorithms for automatic camera parameter tuning. During runtime, RL needs continuous and automatic rewards for every action it takes. It is observed that the SOTA AQuA filter can't provide fine-grained quality evaluation for different AUs. AQuA stands for Analytic Quality Assessment. AQuA protects application accuracy against distorted frames by scoring the level of distortion in the frames. AQuA takes into account the analytical quality of frames, not the visual quality, by learning a novel metric, that is, the classifier opinion score, and uses a lightweight, CNN-based, object independent feature extractor. AQuA accurately scores distortion levels of frames and generalizes to multiple different deep learning applications.

To address this, the exemplary methods define an Analytic Quality (AQ) metric, specific for each AU, and using that metric, the exemplary methods train an AU-specific AQuA-classifier, which provides quality rewards for every RL action. The exemplary embodiments of the present invention conduct multiple evaluations that show efficacy of different components used within CamTuner. CamTuner is the first system that adapts to changing environmental conditions by automatically tuning camera parameters based on the need of the specific AU and improves the accuracy of the AUs.

While CamTuner focuses on camera knobs, the high-level idea applies to any sensor, where there are multiple knobs to be tuned, to adapt and adjust to continuously changing environmental conditions. One such example is a thermal camera, which exposes knobs like "Object Emissivity," "Atmospheric Transmission," "Ambient Temperature." etc. for "Temperature Compensation." These parameters need to be continuously adjusted based on the actual environmental conditions for accurate temperature measurement. Also, for PTZ cameras, knobs like "Pan," "Tilt," and "Zoom" need to be continuously adjusted based on analytics requirements, as the object of interest moves in the scene.

Environmental changes over the entire day induce various distortions in the frame during acquisition (e.g., over-exposure in presence of sunlight, low-light noise and under-exposure during night-time, etc.). These distortions, in turn, affect and most of the time, deteriorate different AU performance, if no changes are done to camera settings as conditions change. Due to the lack of publicly available video datasets capturing daylong environmental variations from the same camera location, the exemplary methods used proprietary videos, which are taken outside, e.g., of a baseball stadium by a single camera from morning to evening.

Under default camera settings, the AU accuracy for the same camera feed varies throughout the day due to the presence of different environmental conditions. Specifically, during noon (in-presence of glaring sunlight), the captured faces inside the frame, get over-exposed, hence result in lower accuracy than the AU performance for the morning-time video. However, evening-time video suffers from low-light noise, which also results in accuracy degradation. Although faces in intermediate afternoon video-frames get slightly occluded which makes detection difficult for the face-detector, but due to better lighting conditions during the afternoon, the person-detector AU can accurately predict the bounding boxes, thus resulting in the best mAP performance.

Regarding the impact of camera settings on the AU, since there exists at least a best-possible camera setting that can improve the AU accuracy observed under default setting, the exemplary methods study how different combinations of camera parameters can impact distinct images and video-snippets captured under various environmental conditions differently.

Regarding virtual knobs, to have repeatability and consistency, the exemplary methods need to be able to capture one particular scene and be able to apply different camera settings on the same scene. As the scene continues to change and a camera can have only a single setting for various knobs, it becomes important to find a digital equivalent for the actual physical settings on the camera. This digital equivalent should faithfully produce the image as if it was captured by changing the physical settings on the camera itself. This digital equivalent is referred to as a digital twin of the camera. Following algorithm 1, reproduced below, it was found that the camera-digital twin for four tuning parameters (brightness, contrast, color-saturation, sharpness) for an AXIS Q1615 network camera to be:

---
Algorithm 1: Digital Twin Algorithm

Input :Digital Knob Values $dval_{list}$;
        Physical Camera Knob Values $pval_{list}$;
1  Obtain im with default physical knob value $pval_{default}$ (i.e., 50);
2  for p in $pval_{list}$ do
3  |    Obtain $im_p$ from the camera changing camera parameter to p
    |    for d in $dval_{list}$ do
4  |  |    $im_{aug}^d \leftarrow$ Augment (im,d);
5  |  |    ssim-val(d) $\leftarrow$ SSIM $(im_p, im_{aug}^d)$
6  |  end
7  |  $d_{t\_win} \leftarrow \arg\max_d$ ssim-val(d)
8  |  return $(p, d_{t\_win})$
9  end
---

This digital twin helps find the equivalent search-space in the digital domain which can also be achieved by traversing the entire physical camera settings space. The knob value in the digital domain is only treated as the faithful representation of a physical knob value when images obtained in both domains with respective knob values provide the maximum SSIM, which is at least greater than 0.90. The equivalent search-space in the digital domain is dependent on the image transformation algorithm being used and the full-reference Image-Quality assessment (FR-IQA) method like structural similarity (SSIM), multiscale-structural similarity (MS-SSIM), MSE and PSNR, etc. used to test the similarity between digitally transformed and actual physical camera frames. These various equivalent search-space ranges in the digital domain are listed in Table 1.

TABLE 1

Calibration of Phy-Digital Knobs

| Tuning-param | Phy-knob Space | MSE/PSNR | SSIM | MS-SSIM |
| --- | --- | --- | --- | --- |
| Brightness | [10, 100] | [0.6, 1.5] | [0.7, 1.2] | [0.8, 1.1] |
| Contrast | [10, 100] | [0.6, 4.0] | [0.6, 3.6] | [0.6, 3.7] |
| Color-Saturation | [10, 100] | [0.5, 1.2] | [0.5, 1.0] | [0.5, 1.3] |
| Sharpness | [10, 100] | [0.1, 2.0] | [0.1, 1.0] | [0.1, 1.5] |

Finally, the union of these different ranges obtained for different FR-IQA methods for a particular tuning parameter is taken as the equivalent digital search-space, listed in Table 2.

TABLE 2

Augmentation factor range in Digital Knob Space

| Tuning-param | Range of α-value |
| --- | --- |
| Brightness | [0.6, 1.6] |
| Contrast | [0.6, 3.6] |
| Color-Saturation | [0.1, 2.0] |
| Sharpness | [0.5, 1.6] |

Regarding the impact of varying virtual knobs, with the equivalent range of parameters in the digital domain, it is next determined how AU accuracy varies while changing one of the four tuning parameters at a time for all the images or frames. The exemplary methods look into the best-possible impact on AU accuracy by changing a single parameter once.

Changing the color-saturation impacts analytical accuracy for face-detection (i.e., mAP) by 5% for 100 random images from the FiveK raw-image dataset. While varying a single tuning knob, the face-recognition AU also recognizes 10 more images out of the 1150 celebrity images randomly selected from the celebA dataset than the baseline. The Liveness-Detection AU detects whether an image is real or fake (i.e., plays significant role for cashless transactions), improves binary classification accuracy by 6.8% while changing the contrast tuning knob, leads to 20 more images out of 280 images from the MSU-MFSD dataset being correctly classified as real or fake.

The variation in the color-saturation tuning knob (i.e., keeping other knobs fixed) improves the mAP by 7% for the face-detection AU on a proprietary night-time video. On the Olympics action-dataset video snippets, while varying contrast improves the mAP of the person detector AU by 9%, mAP of the face-detector AU improves by varying the color-saturation.

Even a coarse-grained way of tuning a single parameter independently on all the images present in a dataset can provide better analytical results. But since the impact of each camera tuning knob on the analytics accuracy is nonmonotonic in nature and each image or video-segment is captured under different environmental conditions and camera-settings, the joint tuning of those four image appearance tuning knobs is considered for each static-image and video-snippet.

Regarding static images, each image available in the public-datasets (e.g., FiveK RAW dataset, celebA, etc.) is a proxy for a video snippet that would have been taken around the time the image was taken. Hence, each image is captured under a different environment and using various camera settings. The best parameter setting at a camera corresponds to the configuration that provides the best AU-specific analytic quality.

Regarding the detection AU, the exemplary methods use Efficientdet-v0 as a person-detector and RetinaNet as a face-detector on randomly selected 100 FiveK raw images. First, person and corresponding face bounding boxes are manually annotated for those 100 raw images. Then Algorithm 2, reproduced below, presents the best-tuple search algorithm for either the face or the person detection AU considering mAP and true-positive IoU jointly as an analytical quality metric.

The exemplary methods first use the parameter range shown in Table 2, but it was observed that the best configuration is towards the upper-limit of those parameter ranges obtained through digital-twin. Hence, the exemplary methods extended the configuration space to make sure another possible best configuration is not missed.

The face-detector AU can detect faces in 39 more images after tuning with the best-configuration than the base-configuration, while for person-detection, best-configuration tuning provides mAP improvement of 2.8% on average and an IoU improvement of 6.7%. Hence, higher improvement after tuning for finer-grained analytics like face-detection is observed, while compared to the person-detection for same set of images.

---

Algorithm 2: Find Best Configuration for Detection

---

Input :Image im and ground-truth gt; Configurations confs
Output:Find conf:<bright,contrast,color,sharp> that provides best AQ for detection
1  for i in confs do
2  | $im_{aug}$ ← Augment (im,i);
3  | dets ← AU ($im_{aug}$);
4  | mAP, true-positive IoU ← mAP (dets, gt) with 0.5 iou-threshold;
5  end
6  First Sort confs using corresponding mAP;
7  Then for same top-1 mAP confs sort using true-positive IoU;
8  return top-1 conf from final sorted list

---

Regarding the face-recognition AU, the exemplary methods consider the face-recognition AU pipeline. Given a database of a person with at least one face image associated with the person, the AU either recognizes the faces in the input-image as known persons (already present in the database) with a match-score, or it classifies it as unknown. One image for each person from the CelebA dataset is used to build the database while various augmented versions of another randomly selected image of the same person are used as query images. Analytical Quality (AQ) for the face-recognition AU is defined as the true-positive match-score for any given image.

Tuning four knobs jointly helps recognize faces in 41 (13.67%) more images correctly than the base-configuration (i.e., without any augmentation) out of 300 non-enrolled images. Even the match score for the true-positive recognition is improved by an average of 3.6% (e.g., maximum analytical quality improvement 11.6%). Changing minEyeDistance configuration from 20 to 40 provides a drastic improvement in recognition with 20.67% more images being recognized with the best-configuration augmentation compared to the base-configuration.

Regarding the facial-keypoint detection AU, the facial keypoint detector AU detects 68 facial landmarks over the faces present in images from the 300W dataset. Analytical Quality of this AU is defined as the root-mean-square (RMS) distance between the predicted and actual landmarks.

Compared to the base-configuration, facial landmarks are being detected in 11 more images out of 230 person images after tuning is performed with the best-configuration. For the detected images, analytical quality is improved by an average of 31.1% under best-configuration tuning than simply using the base-configuration.

The dispersion of the best-parameters throughout the configuration space establishes that each image taken in a different environment with a different camera setting requires different attention (i.e., different best-configurations).

Regarding video-snippets, each video-snippet includes not more than a few hundred continuous frames, thus exhibiting similar environmental conditions and camera-settings throughout the capture. The best-configuration for a video-snippet must provide optimal analytical quality across all frames throughout the video-snippet. The exemplary methods use the detection AU (e.g., face and person detection AU) on 19 video snippets from the HMDB dataset and 11 video snippets from the Olympics dataset after manually annotating the face and person bounding boxes using the cvat-tool.

Table 3 below shows the maximum and average analytical quality improvement that can be achieved after tuning each video-snippet differently.

TABLE 3

Best Configuration Accuracy Improvement

|  |  | mAP improvement | |
| --- | --- | --- | --- |
| Video-Dataset |  | Max | Mean |
| Olympics | FaceDetection | 19.23 | 1.68 |
|  | PersonDetection | 40.38 | 8.38 |
| HMDB51 | FaceDetection | 18.75 | 4.22 |
|  | PersonDetection | 57.59 | 12.63 |

Each video-segment in the Olympics and HMDB datasets are heavily compressed. Thus, the person-detection AU, which is more coarse-grained, looks for a much larger space, that is, more pixels in the frame to detect a person, and can tolerate such compression better than the fine-grained face-detection AU. However, the fine-grained face detection, which generally looks for much smaller spaces in the frame, that is, fewer pixels to detect faces, provides less improvement in detection of smaller faces with severe compression artifacts rather than the person-detection AU, also shown in Table 3.

For each static-image or video-snippet exhibiting a different environmental condition with a distinct camera setting (embedded with different contents) in coalition with different AUs, there exists a unique set of parameters that provides the highest AU accuracy. These parameters are not possible for a human to identify. Moreover, a human cannot keep adjusting these parameters as the environment changes.

Hence, automatic tuning of these knobs is required to obtain the optimal AU performance under various environments and camera settings.

The control loop to modify the tuning knobs in a network camera and to improve the analytic quality for a given AU is shown in system 100 of FIG. 1. Live-video feeds are continuously being captured by the image sensor 102 at the network camera from the external environment, and then various image-processing techniques 104 are applied through the ISP pipeline to obtain the final processed frame. Before offloading it to edge-server or remote-cloud for further analytics using a wireless network (4G or 5G), these processed frames are filtered by a lightweight AQuA-filter 106 that aids to discard the low-quality frames that might lead to high-confidence errors (not suitable for the AU). This also helps to reduce the wireless network bandwidth requirement through early-discard of frames that do not contribute to AU accuracy improvement or camera-parameter tuning for better analytics.

On the edge server, filtered and offloaded frames are parallelly passed through a different analytic pipeline and a fine-grained AU-specific analytic quality evaluator 110. The exemplary methods can employ the analytic quality evaluator with joint mAP and an IoU metric for any detection AU, match-score for face-recognition AU, and RMS distance between predicted and actual keypoints in the case of keypoint detection. But all these evaluators require ground-truths (or labelled data), that is not possible during runtime unless a human is kept in the control loop that continuously labels the incoming frames for several analytics, which is not practical.

As a substitute to generating the ground-truth (not possible in an actual deployment), which can be used for determining the AU quality, the exemplary methods introduce a fine-grained proxy quality evaluator 110. The proxy quality evaluator 110 is AU-specific and provides a quality estimate that can be used to determine the quality of offloaded frames. Based on the AU quality, determined from the proxy quality evaluator 110, the camera parameters are tuned automatically, to improve the AU quality further. Camera vendors provide APIs through which camera parameters can be changed programmatically. It usually takes a very short time (around 150 to 200 milliseconds) to change the parameters, so this approach is feasible in dynamically tuning camera parameters. This tuning process continues over the lifetime of the AU. Specifically, the exemplary methods use Reinforcement Learning (RL) techniques to tune the parameters.

Regarding camera-parameter tuning, to automatically tune the camera parameters, the exemplary methods employ RL techniques for each individual AU 108. Particularly, the exemplary methods use a State-Action-Reward-State-Action (SARSA) RL algorithm 115 or RL computations. In this setup, there is an agent, which interacts with the environment, that is, the state it is in, by taking different actions. As the agent takes actions, it lands into a new and different environment. For each action, there is an associated reward or penalty, depending on whether the newly achieved state is desired or not, that is, whether it is guiding the agent towards a positive direction or a negative direction. Over time, as the agent continues taking actions and receives rewards and penalties, the agent learns to maximize the rewards by taking the right actions, which ultimately leads the agent towards a positive direction.

SARSA 115 does not require any labelled data or a pre-trained model, rather SARSA 115 learns and updates its policy based on the action it takes. Therefore, SARSA 115 is an on-policy learning algorithm and needs clear definition of the environment, that is, state, action and reward. For the purpose of automatic camera-parameter tuning, the following is defined:

Regarding the state, this is a vector including the current brightness, contrast, sharpness and color parameter values of the camera and the measure of brightness, contrast, sharpness and color.

Regarding the action, the set of actions that the agent can take are increase or decrease one of the brightness, contrast, sharpness or color parameter values or not take any action at all.

Regarding the reward, the exemplary methods use the proxy quality evaluator 110 for each AU 108 as the reward function for the SARSA 115. If the quality estimate improves, then it is considered as a reward, whereas if it decreases, then it is considered as a penalty.

The reward obtained using the proxy quality evaluator 110 is termed as the immediate reward. Along with considering the immediate reward, the agent also factors in a future reward that may accrue as a result of the current actions. Based on this, a value, termed as Q-value is calculated for taking an action $\alpha$ when in state s. This is denoted as Q(s,a). The value for Q(s,a) is calculated as per the equation below. Here, $\alpha$ is a constant with a value between 0 and 1. This can be used to control how much importance is to be given to new information obtained by the agent. A value of 1 will give high importance to the new information, while a value of 0 will stop the learning phase for the agent. During the initial phase, a higher value e.g., 0.9 can be assigned by the operator, which will help the agent quickly learn and understand the new environment by giving higher importance to the most recent information. After the agent has learnt and assimilated the information from the new environment, the value of a can be lowered e.g., 0.1 by the operator so that the agent now starts using the gathered information about the new environment.

$$Q(s,a) \leftarrow Q(s,a) + \alpha[r + \gamma \cdot Q(s',a') - Q(s,a)]$$

Similar to $\alpha$, there is another constant $\gamma$ in the above equation, which has a value between 0 and 1. This constant is called the discount factor and can be used to control the importance given by the agent to any long-term rewards. A value of 1 will give high importance to long term rewards while a value of 0 will make the agent ignore any long-term rewards and focus only on the immediate rewards. If the conditions change very frequently, then a lower value e.g., 0.1 can be assigned to $\gamma$ to prioritize immediate rewards, while if the conditions do not change frequently, then a higher value e.g., 0.9 can be assigned to prioritize long term rewards.

The algorithm followed by the agent in the SARSA algorithm 115 is Algorithm 3 below.

Algorithm 3: State-Action-Reward-State-Action loop

```
1   s ← Observe-Environment ( )
2   a ← Choose-Action(Q, s)
3   while Still-Processing( ) do
4   |   Perform-Action(a)
5   |   r ← Compute Reward ( )
6   |   s' ← Observe-Environment( )
7   |   a' ← Choose-Action(Q, s')
8   |   Q (s, a) ← Q (s,a) + alpha × [r + gamma × Q (s', a') − Q
    |       (s, a)]
9   |   s ← s'
10  |   a ← a'
11  end
```

Here, the agent first observes the environment, that is, state s and chooses an appropriate action a to be performed in state s. After performing the action a, the agent receives an immediate reward (or penalty) r and is now in a new state s'. In this new state, the action chosen by the agent is a' and the associated Q-value is Q(s',a'), which the agent uses to compute the cumulative reward Q(s,a) as per the equation above. The agent then updates this computed cumulative Q-value and is now in the new state s'. This process continues for the lifetime of the AU as the agent continuously learns and adapts to the environment.

While algorithm 3 provides the steps followed by the agent in SARSA 115, it does not provide the exact method used by the agent to choose the action a to be performed.

For this, the exemplary methods devise a new policy for the agent to decide the action to be performed. This policy is shown in algorithm 4 below. In this, a constant called epsilon is defined, which has a value between 0 and 1, and can be tweaked by the operator.

| | Algorithm 4: Policy for choosing the action to perform |
|---|---|
| | Input: Q,s,a,r |
| 1 | if rand (0,1) ≥ epsilon then |
| 2 |   \| return Random-Action( ) |
| 3 | end |
| 4 | if r < 0 then |
| 5 |   \| return Revert(a) |
| 6 | end |
| 7 | a' ← Max-Action (Q, s) |
| 8 | if r > Q (s,a') then |
| 9 |   \| return a |
| 10 | end |
| 11 | return a' |

Initially, the agent generates a random number between 0 and 1. If the random number is greater than the set value of epsilon, then a random action is chosen. A lower value of epsilon will trigger more random actions to be generated while a higher value of epsilon will trigger less random actions. Therefore, during the initial phase of the deployment, when the agent explores various actions, usually the value of epsilon is set lower e.g., 0.1, while after the agent has explored enough, the value of epsilon is set higher e.g., 0.9, so that the agent starts using the learned information from the earlier exploration phase and starts exploiting it. If the random number is lower than the set value of epsilon then the reward r is checked. If the reward is less than 0, that is, if the action results in a penalty, then the action is reverted immediately. However, if the reward is positive but less than the predicted reward for the action, then the same action is repeated. Thus, this is a greedy policy where the actions leading in a positive direction are repeated while the actions leading in a negative direction are immediately reverted.

Regarding the AU-specific quality evaluator design, the AU-agnostic SOTA AQuA-filter provides a nominal spearman correlation ($\approx$−0.03) between predicted quality and the different analytical quality. Although, this AU-agnostic AQuA filter is able to filter out inferior-quality frames on which the AU provides a high-confidence error, it fails to differentiate among good-quality offloaded frames through fine-grained quality value prediction. Hence, during run-time, to get the continuous quality measure (e.g., reward function for the RL algorithm) for any given offloaded frame passed by the AQuA-filter, the exemplary methods design AU-specific fine-grained proxy quality evaluator models. These quality evaluator models are defined and trained for different AUs, as follows:

For the face-recognition AU, for 300 randomly sampled celebrities from the celebA dataset, two images are selected, one as a reference image to build the database and another as a non-enrolled image and its multiple augmented variants (e.g., obtained by changing 4 knob-values) are used as query images. These query images ($\approx$4M) constitute a training dataset for the quality evaluator model. Each of these query images when sent to the face-recognition model, provide a celebrity name with a match score between [0,1]. For every correct face-recognition, the exemplary methods use the corresponding rounded value of matchScore*100 as the class-label. A total of 101 classes can be there in the training dataset. Hence, the existing AQuA model can be trained with 101 output nodes.

For the person and face detector AU, to design a quality evaluator specific to these detector AUs, the exemplary methods train the AQuA classifier model with 201 output nodes on the Olympics and HMDB training video frames and their augmented variants (=7.5M). While training, each frame is associated with a class label based on the joint-metric of mAP and the IoU for true-positive detections as shown in the equation below. Hence, the higher the class label, the better the analytic quality.

$$classlabel \leftarrow mAP+IOU_{True\text{-}Positive}*100$$

To study the effectiveness of CamTuner, one approach is to work with real cameras and show the impact of the approach by comparing the AU accuracy in two cases, e.g., first case where the exemplary technique is not applied and static camera parameters ae present, and in the second case, the exemplary methods apply the technique and dynamically tune the camera parameters. However, the problem with this approach is that the camera can have only one set of parameters at any given point in time and both conditions (with and without the exemplary technique) cannot be run at the same time using a single camera. If performed at separate times, then the environmental (e.g., sunny, cloudy, etc.) as well as the scene conditions (e.g., faces seen in the field of view) will be different, and therefore, it will not be a fair comparison.

An alternate approach could be that the exemplary methods use two cameras, where the AU is run on a first camera feed and the technique is not applied, and let the camera parameters be the same and measure AU accuracy, while on the other camera feed, the same AU is run but the exemplary technique is applied to tune the camera parameters dynamically. The measured accuracy in these two cases is then compared. In this scenario, the environmental conditions seen by the two cameras will be similar, however, the scene conditions, although similar, won't be exact. Some AUs can be very sensitive and may not give the same result on similar images, e.g., the result depends on very fine characteristics in the frame and may produce different results with slight variations in the image. Thus, even this will not be a fair comparison. Besides, even if the AU is tolerant to slight variations in images, since changes in environmental conditions are not deterministic, it will take very long to perform various experiments, including trying out different configurations, training and testing RL algorithms, trying different reward functions for RL, etc.

Figure 2:
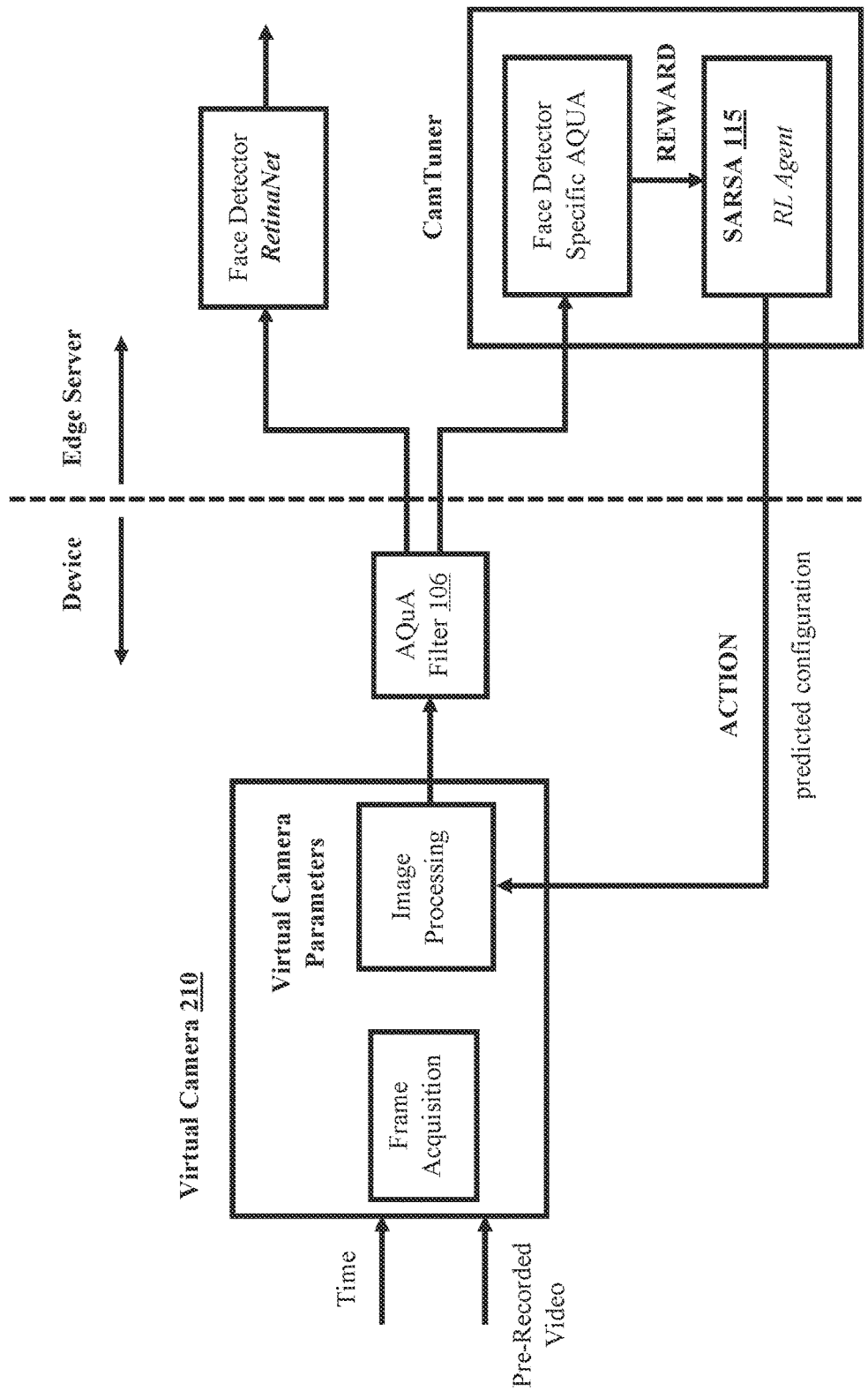
FIG. 2 is a block/flow diagram of an exemplary control loop to modify virtual camera parameters, in accordance with embodiments of the present invention.

Because of the issues discussed above in using real camera feeds, the exemplary methods study the effectiveness of the exemplary approach by using pre-recorded videos, as in the system 200 of FIG. 2. These videos are recorded with a single camera 210 setting in a broad daylight condition. By doing so, good quality original video feed can be obtained, which has certain environmental conditions (daylight, in this case) and certain scene conditions (e.g., faces of people), and the exemplary methods can also obtain the ground truth on these videos. Two cameras are then simulated, which are referred to as virtual cameras, such that they expose the same parameters as the real cameras, and these parameters can be changed through APIs. By doing so, experiments can be conducted with various configurations being applied to the exact same scene, which enables repeatability and reproducibility in the experiments, which is not possible with a real camera. Further, the experiments can run faster than real-time, that is, run through frames at a higher frame-per-second (FPS), as desired, and be able to independently test and train RL algorithms, various reward functions used for RL, etc.

These virtual cameras need to emulate the same daylong environmental variation starting from sunrise, to noon, afternoon, dusk, night etc. The virtual-camera simulator design includes two phases, that is, an offline profiling phase and an online phase. During the offline profiling phase, first following algorithm 5 below, the exemplary methods generate a virtual-camera (VC) table and a mapping function that maps a particular time in a day to its corresponding <brightness, contrast, color-saturation, sharpness> feature values observed during that time.

---

Algorithm 5: VC Table Generation

Input :daylong hour-wise video-segments $V_H$; sampling-rate $S_R$;
1  for hour in range(0,24) do
2  | for video with timestamp ∈ [hour, hour+1) do
3  | | frames ← DecodeFrames (video, $S_R$)
4  | | for frame in frames do
5  | | | split each frame into 12 tiles
6  | | | tiles ← SplitFrame (frame)
7  | | | for tile in tiles do
   | | | | // featureList ← <brightness , contrast , color ,sharp
8  | | | | featureList$_{tile}^{info}$ = ExtractFeatures (tile)
9  | | | end
10 | | end
11 | end
12 | Compute Mean Value featureList$_{tile}^{hour}$
13 | Compute Standard Deviation featureList$_{tile}^{hour}$
14 end
15 return 12 tables corresponding to each tile interpolating the Mean
15 featureList$_{tile}^{hour}$ for each 15 mins interval

---

As different parts of the frame lit up differently (e.g., presence of obstacle, shadows, different color light-sources etc.), instead of computing these feature values for the entire frame, the exemplary methods obtain the feature-values for each of, e.g., 12 tiles in a frame.

Each video captures the content as well as the environment for that acquisition-time. Since, the observed content needs to be kept the same by the virtual cameras, only environmental conditions throughout the day affect the captured frame. Through the camera parameter tuning RL approach, the exemplary methods endeavor to minimize the adverse environmental effect on AU performance. Keeping the content the same, to augment the video for different times of the day, the exemplary methods need to generate another mapping table that maps the <brightness, contrast, color-saturation, sharpness> change between two times to corresponding virtual camera knob configurations to achieve that change. In the offline phase, the exemplary methods generate this delta change-to-Configuration mapping table by following algorithm 6, reproduced below.

---

Algorithm 6: Delta-change to Configuration mapping Table Generation

Input :daylong hour-wise video-segments $V_H$; sampling-rate $S_R$;
       $r_B, r_{Con}, r_{Col}, r_S$ are ranges for four knobs obtained from Table 2;
1  for randomly selected Frame from each hour do
2  | for tile in range(1,13) do
   | | // featureList ← <brightness, contrast, color, sharpness>
3  | | featureList$_{tile}^{org}$ ← ExtractFeatures (frame$_{tile}$)
4  | | for augFactors ∈ ($r_B$or$_{Con}$or$_{Col}$or$_S$) do
   | | | // <Bright, Contrast, Color, Sharp> ← augFactors
5  | | | augFrame$_{tile}$ ← AugmentFrame (Frame$_{tile}$, augFactors)
6  | | | featureList$_{tile}^{aug}$ ← ExtractFeatures (augFrame$_{tile}$)
   | | | // compute delta changes after augmentation
7  | | | $$\text{delta}[0] = \frac{featureList_{tile}^{aug}[0]}{featureList_{tile}^{org}}$$
8  | | | compute delta[1], delta[2], delta[3] for 3 other knobs
9  | | | Store <delta> corresponding to augFactor
10 | | end
11 | end
12 end
13 Compute Median <delta> for same augFactor across sampled frames for a specific tile
14 return 12 configuration-vs-<delta> Mapping tables for each tile

---

During the online phase, to simulate a frame for a different environmental condition corresponding to a time of the day other than its capture time, following algorithm 7 below, the exemplary methods first split the input frame into 12 tiles.

---

Algorithm 7: Runtime VC Simulator

Input :input frame corresponding to time T1, inpFrame$^{T1}$; Output Time T2;
Output: input frame corresponding to output time T2, inpFrame$^{T2}$;
// split input frame into 12 tiles
1  inpFrame$_{tile}^{T1}$ ← SplitFrame (inpFrame$^{T1}$) for tile in range(1,13)
do
   | // featureList ← <brightness, contrast, color, sharpness>
   | // Measure input frame features
2  | featureList$_{tile}^{T1}$ ← ExtractFeatures (inpFrame$_{tile}^{T1}$)
   | // obtain features corresponding to output time
3  | Get featureList$_{tile}^{T2}$ from VC-table 5
   | // compute delta change from T1 to 12 for 4 knobs
4  | $$\text{delta}[0] = \frac{featureList_{tile}^{T2}[0]}{featureList_{tile}^{T1}[0]} \text{ // brightness}$$
5  | obtain delta[1], delta[2] and delta[3]
6  | config ← Map(<delta>) using table generated in Alg 6
7  | append config to a configList
8  end
9  config$_{median}$ ← Median(configList)
10 inpFrame$^{T2}$ ← AugmentFrame (inpFrame$^{T1}$, config$_{median}$)

---

Now for each tile, the exemplary methods need to extract the 4 different image features, and also based on the desired time (other than the capture time) and using the VC table (output of algorithm 5), the exemplary methods can get the tile-specific desired values of the image features. The fractional delta-change between the current feature values and the desired feature values will be mapped to a virtual camera knob configuration value using a delta change-to-Configuration mapping table (output of algorithm 6). The exemplary methods obtain different knob configurations for each tile, however, to eliminate the tiling-issue (separation of tiles is explicit) in the output frame, the exemplary methods compute the median configuration across all 12 configurations corresponding to each tile. With the modified median knob configuration, the exemplary methods can get the video-frame for the desired time.

In conclusion, CamTuner uses reinforcement learning techniques to continuously adapt to changing environmental conditions. CamTuner tunes specific camera parameters, so that the video feed produced by the camera is suitable for the analytics task at hand and improves its accuracy. CamTuner is designed in such a way that it can be applied to any video analytics task and can handle any set of complex camera parameters. To have repeatability and reproducibility of the evaluation (using the same scene to evaluate the performance before and after applying CamTuner), the exemplary methods use a virtual camera and loop-through prerecorded proprietary videos taken at different time-segments of day (FIG. 2). With the help of the VC, the exemplary methods can run experiments faster in real-time, that is, run through frames at a higher FPS, as desired, and be able to independently test and train RL algorithms, various reward functions used for RL, etc. The virtual camera (VC) is the same as actual RGB camera, where depending on the capture time of the day, scene characteristics adapt to that time without changing the frame content. VC continuously extracts frames from the input video and applies transformations to change its capture time to emulate different time-segments of the day. Before offloading to the edge-server, frames are passed through AU-agnostic SOTA AQuA filter.

Figure 3:
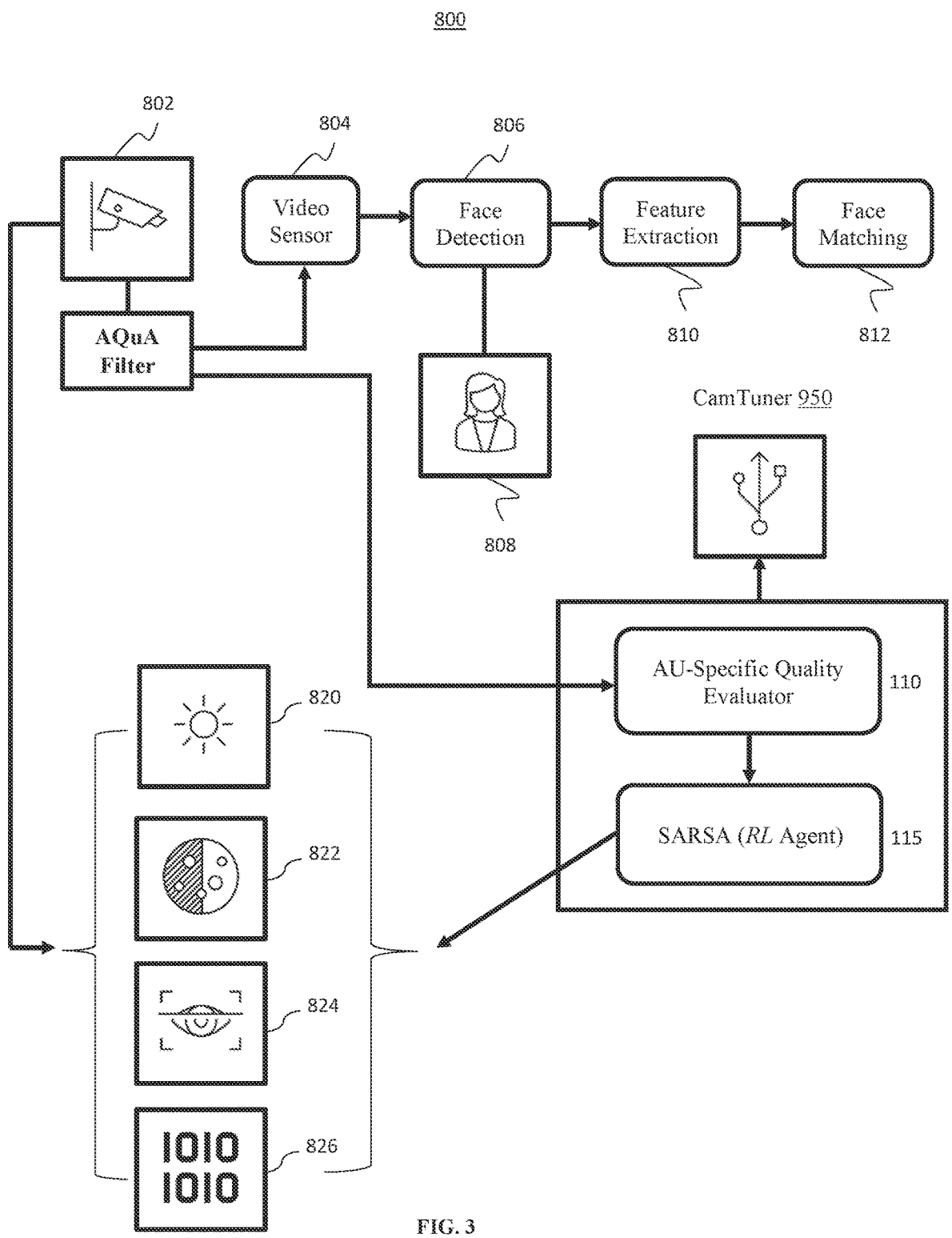
FIG. 3 is an exemplary practical application for automatically adjusting camera parameters to improve video analytics accuracy during continuously changing environmental conditions, in accordance with embodiments of the present invention.

FIG. 3 is a block/flow diagram 800 of a practical application for automatically adjusting camera parameters to improve video analytics accuracy during continuously changing environmental conditions, in accordance with embodiments of the present invention.

In one practical application, video feed from camera 802 is decoded by "Video Sensor" 804 and frames are made available to "Face Detection" component 806, which detects faces 808 (objects) and makes them available to the "Feature Extraction" component 810. Unique face templates, such as features are then extracted and made available to the "Face Matching" component 812, which compares and matches these features with a gallery of face features. The environmental changes can be detected by the CamTuner 950 employing the AU-specific quality evaluator 110 and the SARSA 115 to fine-tune camera parameters, such as, brightness 820, contrast 822, color-saturation 824, and sharpness 826.

Figure 4:
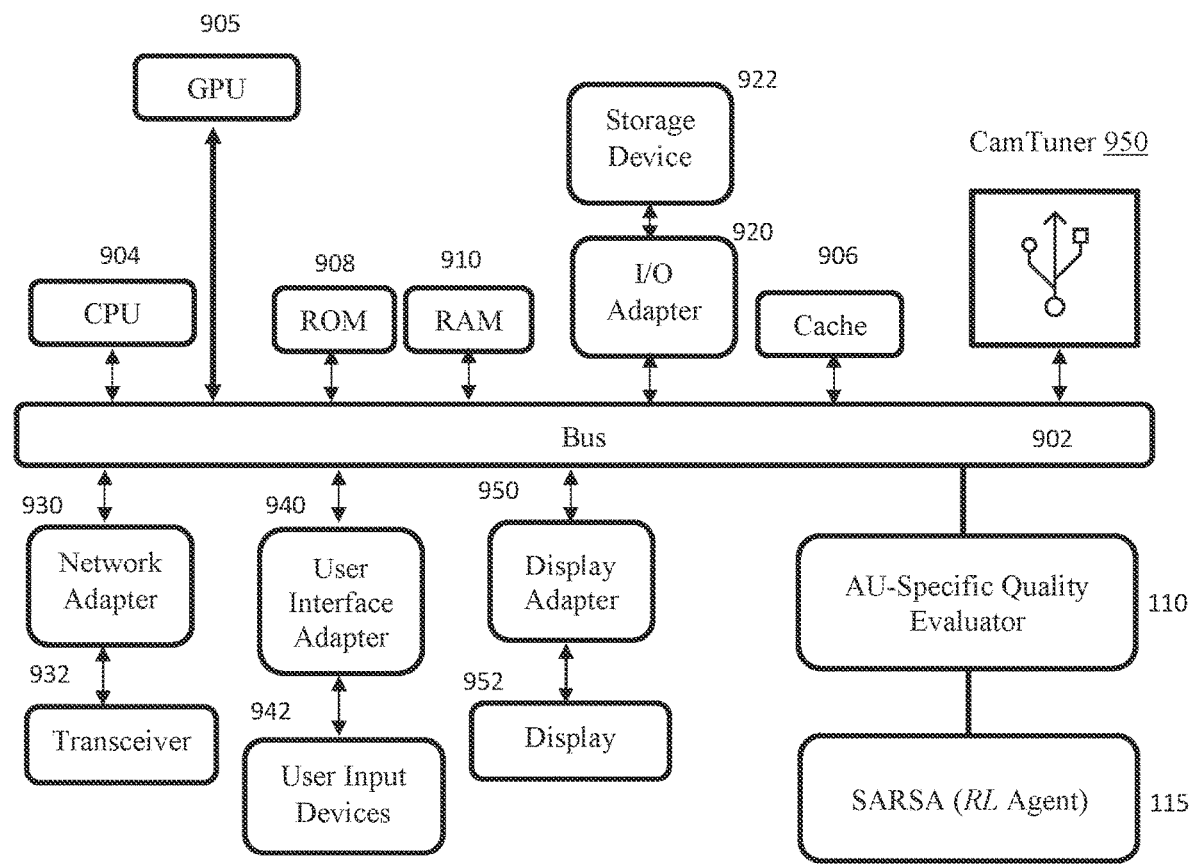
FIG. 4 is an exemplary processing system for automatically adjusting camera parameters to improve video analytics accuracy during continuously changing environmental conditions, in accordance with embodiments of the present invention.

FIG. 4 is an exemplary processing system for automatically adjusting camera parameters to improve video analytics accuracy during continuously changing environmental conditions, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the CamTuner 950 includes an AU-specific quality evaluator 110 and SARSA 115.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 5:
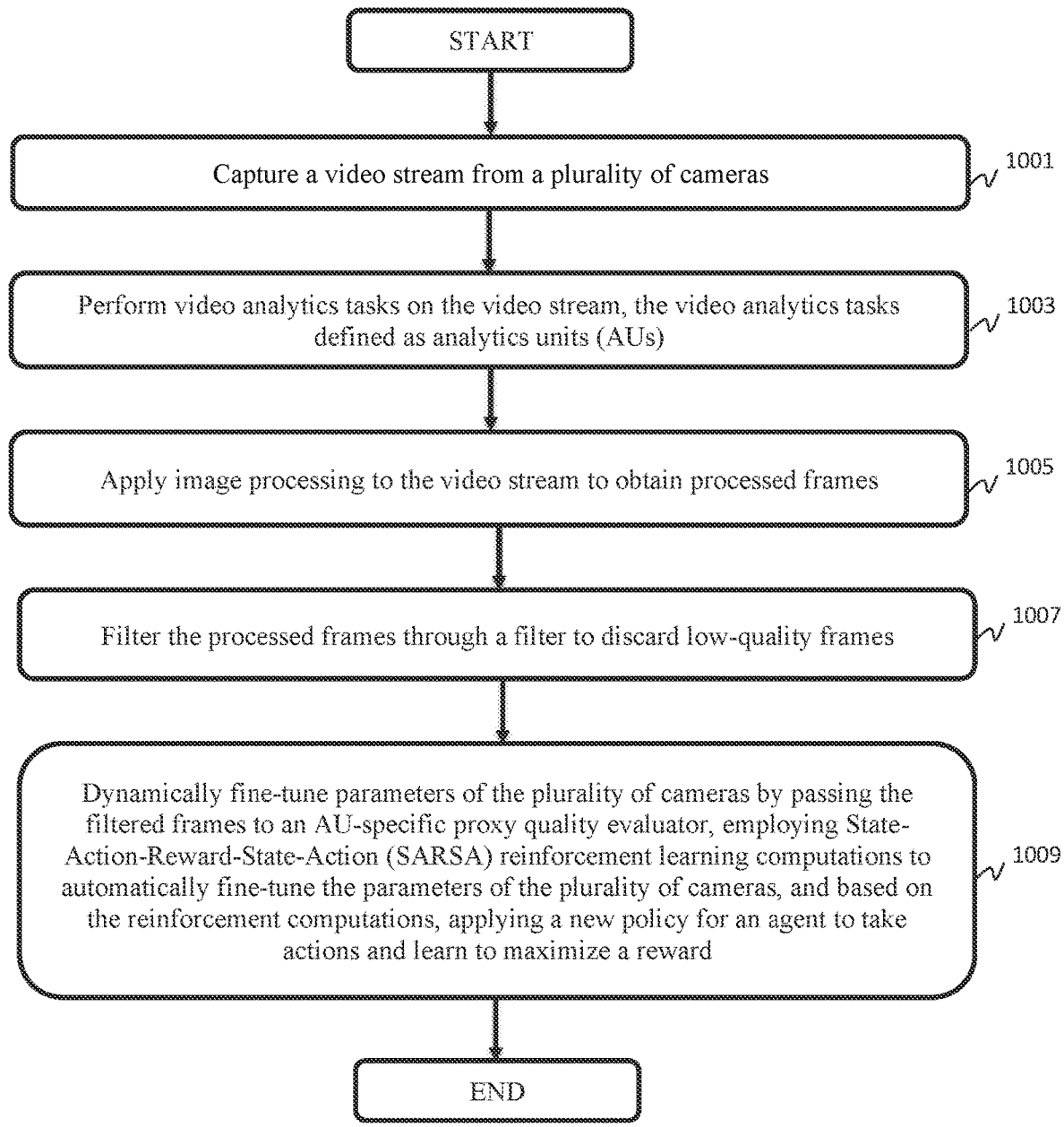
FIG. 5 is a block/flow diagram of an exemplary method for automatically adjusting camera parameters to improve video analytics accuracy during continuously changing environmental conditions, in accordance with embodiments of the present invention.

FIG. 5 is a block/flow diagram of an exemplary method for automatically adjusting camera parameters to improve video analytics accuracy during continuously changing environmental conditions, in accordance with embodiments of the present invention.

At block 1001, capture a video stream from a plurality of cameras.

At block 1003, perform video analytics tasks on the video stream, the video analytics tasks defined as analytics units (AUs).

At block 1005, apply image processing to the video stream to obtain processed frames.

At block 1007, filter the processed frames through a filter to discard low-quality frames.

At block 1009, dynamically fine-tune parameters of the plurality of cameras by passing the filtered frames to an AU-specific proxy quality evaluator, employing State-Action-Reward-State-Action (SARSA) reinforcement learning computations to automatically fine-tune the parameters of the plurality of cameras, and based on the reinforcement computations, applying a new policy for an agent to take actions and learn to maximize a reward.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module." "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention.

Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for automatically adjusting camera parameters to improve video analytics accuracy during continuously changing environmental conditions, the method comprising:
    capturing a video stream from a plurality of cameras;
    performing video analytics tasks on the video stream, the video analytics tasks defined as analytics units (AUs);
    applying image processing to the video stream to obtain processed frames;
    filtering the processed frames through a filter to discard low-quality frames; and
    dynamically fine-tuning parameters of the plurality of cameras by:
        passing the filtered frames to an AU-specific proxy quality evaluator;
        employing State-Action-Reward-State-Action (SARSA) reinforcement learning (RL) computations to automatically fine-tune the parameters of the plurality of cameras; and
    based on the reinforcement computations, applying a new policy for an agent to take actions and learn to maximize a reward, wherein the SARSA RL computations include a state, an action, and a reward, the state being a vector including current brightness, contrast, sharpness and color parameter values of a camera of the plurality of cameras and a measure of brightness, contrast, sharpness and color, the action is an increase or decrease of one of the brightness, contrast, sharpness or color parameter values or taking no action at all, and the reward is a AU-specific quality evaluator's output.

2. The method of claim 1, wherein a virtual-camera (VC) is employed to:
    apply different environmental characteristics and evaluate different camera settings on an exact same scene captured from the video stream; and
    rapidly and independently train and test RL algorithms, and various reward functions used for RL.

3. The method of claim 2, wherein the VC includes an offline profiling phase and an online phase.

4. The method of claim 3, wherein, during the offline profiling phase, a VC-camera table and a mapping function are generated, the mapping function mapping a particular time in a day to its corresponding brightness, contrast, color-saturation, and sharpness feature values observed during that time.

5. The method of claim 3, wherein, during the online phase, a frame for a different environmental condition corresponding to a time of day other than its capture time is simulated.

6. The method of claim 1, wherein an analytic quality (AQ) metric specific for each of the AUs is employed to train an AU-specific quality evaluator.

7. The method of claim 6, wherein, in the absence of ground truth in real-world deployments, the AU-specific quality evaluator is used as a proxy to evaluate the AUs.

8. A non-transitory computer-readable storage medium comprising a computer-readable program for automatically adjusting camera parameters to improve video analytics accuracy during continuously changing environmental conditions, wherein the computer-readable program when executed on a computer causes the computer to perform the steps of:
    capturing a video stream from a plurality of cameras;
    performing video analytics tasks on the video stream, the video analytics tasks defined as analytics units (AUS);
    applying image processing to the video stream to obtain processed frames;
    filtering the processed frames through a filter to discard low-quality frames; and
    dynamically fine-tuning parameters of the plurality of cameras by:
        passing the filtered frames to an AU-specific proxy quality evaluator;
        employing State-Action-Reward-State-Action (SARSA) reinforcement learning (RL) computations to automatically fine-tune the parameters of the plurality of cameras; and
    based on the reinforcement computations, applying a new policy for an agent to take actions and learn to maximize a reward, wherein a virtual-camera (VC) is employed to:
    apply different environmental characteristics and evaluate different camera settings on an exact same scene captured from the video stream; and
    rapidly and independently train and test RL algorithms, and various reward functions used for RL
    wherein the VC includes an offline profiling phase and an online phase such that during the online phase, a frame for a different environmental condition corresponding to a time of day other than its capture time is simulated.

9. The non-transitory computer-readable storage medium of claim 8, wherein, during the offline profiling phase, a VC-camera table and a mapping function are generated, the mapping function mapping a particular time in a day to its corresponding brightness, contrast, color-saturation, and sharpness feature values observed during that time.

10. The non-transitory computer-readable storage medium of claim 8, wherein an analytic quality (AQ) metric specific for each of the AUs is employed to train an AU-specific quality evaluator.

11. The non-transitory computer-readable storage medium of claim 10, wherein, in the absence of ground truth in real-world deployments, the AU-specific quality evaluator is used as a proxy to evaluate the AUs.

12. A system for automatically adjusting camera parameters to improve video analytics accuracy during continuously changing environmental conditions, the system comprising:
    a memory; and
    one or more processors in communication with the memory configured to:
        capture a video stream from a plurality of cameras;
        perform video analytics tasks on the video stream, the video analytics tasks defined as analytics units (AUs);
        apply image processing to the video stream to obtain processed frames;
        filter the processed frames through a filter to discard low-quality frames; and
        dynamically fine-tune parameters of the plurality of cameras by:
            passing the filtered frames to an AU-specific proxy quality evaluator;
            employing State-Action-Reward-State-Action (SARSA) reinforcement learning (RL) computations to automatically fine-tune the parameters of the plurality of cameras; and based on the reinforcement computations, applying a new policy for an agent to take actions and learn to maximize a reward, wherein a virtual-camera (VC) is employed to:

apply different environmental characteristics and evaluate different camera settings on an exact same scene captured from the video stream; and rapidly and independently train and test RL algorithms, and various reward functions used for RL, wherein the VC includes an offline profiling phase and an online phase such that during the online phase, a frame for a different environmental condition corresponding to a time of day other than its capture time is simulated.

13. The system of claim 12, wherein, during the offline profiling phase, a VC-camera table and a mapping function are generated, the mapping function mapping a particular time in a day to its corresponding brightness, contrast, color-saturation, and sharpness feature values observed during that time.

* * * * *